United States Patent [19]

Itoh

[11] Patent Number: 4,656,727
[45] Date of Patent: Apr. 14, 1987

[54] TOOL MOUNTING AND DEMOUNTING DEVICE FOR CHANGING TOOLS OF A DRILLING MACHINE

[75] Inventor: Kimio Itoh, Kawasaki, Japan

[73] Assignee: Kabushiki Kaisha Ito Seisakusho, Tokyo, Japan

[21] Appl. No.: 647,647

[22] Filed: Sep. 6, 1984

[51] Int. Cl.⁴ .............................................. B23Q 3/155
[52] U.S. Cl. ......................................... 29/568; 279/7; 279/43; 279/50; 408/31
[58] Field of Search ................. 29/568, 26 A; 279/43, 279/37, 50, 80, 82, 79, 107, 1 F, 35, 41 R, 46 R, 89; 408/31, 35, 239 R, 240; 409/234

[56] References Cited

U.S. PATENT DOCUMENTS

| | | | |
|---|---|---|---|
| 935,977 | 10/1909 | Haskell | 279/50 |
| 1,013,438 | 1/1912 | Post | 279/50 |
| 3,413,702 | 12/1968 | Burg | 408/35 |
| 3,596,917 | 8/1971 | Meyer | 279/89 |
| 4,000,954 | 1/1977 | Patel | 408/31 |
| 4,088,417 | 5/1978 | Kosmowski | 408/46 |
| 4,395,051 | 7/1983 | Tonomura | 279/82 |

FOREIGN PATENT DOCUMENTS

| | | | |
|---|---|---|---|
| 1376 | 1/1978 | Japan | 408/239 A |
| 192731 | 11/1983 | Japan | 29/568 |
| 506469 | 8/1976 | U.S.S.R. | 279/37 |

Primary Examiner—Gil Weidenfeld
Assistant Examiner—Daniel W. Howell
Attorney, Agent, or Firm—Oblon, Fisher, Spivak, McClelland & Maier

[57] ABSTRACT

A tool mounting and demounting assembly for a drilling machine includes a cylindrical support mounted on a rotatable drill shaft into which a tool holder can be inserted. The tool holder has a groove which is engagable by a hook of a tongue mounted on the cylindrical support. A collar surrounding the cylindrical support can be biased to a position which forces the hooks inward so as to engage the groove for mounting a tool. A tool support holds the tool holder along an axis coaxial with that of the drill shaft so that the cylindrical support can be lowered onto the tool holder. The surface of the tool support engages and raises the collar for releasing the hooks from the groove so as to permit the demounting of a tool.

2 Claims, 5 Drawing Figures

TOOL MOUNTING AND DEMOUNTING DEVICE FOR CHANGING TOOLS OF A DRILLING MACHINE

BACKGROUND OF THE INVENTION

1. Field of the Invention

The present invention relates to a tool mounting and demounting device of a drilling machine.

2. Description of the Prior Art

A conventional tool mounting and demounting device for a drilling machine is explained with reference to FIG. 1. An inner cylindrical part f is connected to the lower end of the rotational main shaft a of a drilling machine. Shank e of the tool holder A grasps a tool, e.g. shank part c of a tap b, by the collet part d. The cylindrical wall g of the cylindrical part f is formed with through hole i in which balls h can move in the radial direction, the diameter of the balls h being larger than the thickness of the cylindrical wall g. A collar body j is mounted on the outer circumference of the cylinder wall g in such a manner that it can slide up and down along the cylindrical wall g. A large diameter part k is connected to the lower part of the inner wall of the collar body j. A recess 1 is formed in the tool holder A to which the balls h can be inserted. A safety guard m is mounted to the outer circumference of the tool holder A in such a way that it can freely be rotated relative to the tool holder.

In the case where the tap b is to be removed from the rotating main shaft a, and to be replaced with another rotary tool e.g. a drill, the tool holder A is still rotating when the safety guard m is gripped by one hand. Then, the collar body j is grasped by other hand and is lifted, and the large diameter part k of the lower part of the inner wall of the collar body j is shifted to the position of balls h. The balls h can then move radially out of the through hole i, and a part of each of the balls is inserted into the large diameter portion k. The engagement of the tool holder A and inner cylinder f by way of the balls h is thus released, and the tool holder A can be pulled out in a downwards direction.

After the tap and drill are exchanged for others, and the safety guard m is gripped, the tool holder A is inserted into the inner cylinder f and the collar body j is pulled downwards. The balls which have been shifted radially outward of the cylinder f are pushed radially inward to reengage the recess 1 of the tool holder A. As a result, the cylinder f and tool holder A are engaged through the balls h, and the drill may be driven by the rotary spindle a.

Such a tool mounting and demounting device of a drilling machine allows one to change a rotary tool (with the rotary tool holder as one body) while the rotational main shaft a is rotating, and is convenient for efficient exchange of a tool. However, for the purpose of increasing machining efficiency by positioning various rotary tools at a certain location, moving the rotary main spindle itself to that location and automatically exchanging a rotary tool, the driving mechanism employing balls as above cannot be used for the automatic control system because the tool holder A cannot be picked up. The above system also has the disadvantage of being complicated because of the use of balls, and requires complex machining technology resulting in high prices.

SUMMARY OF THE INVENTION

The present invention has as its object to provide a simple and inexpensive tool mounting and demounting device for the exchange of drilling machine tools which can eliminate the above advantages and which allows not only the manual exchange of rotary tools, but which also can simply and automatically exchange the rotary tools with only the upwards and downwards motion of the rotating main spindle by previously positioning various rotary tools in a specific place.

BRIEF DESCRIPTION OF THE DRAWINGS

Various other objects, features and attendant advantages of the present invention will be more fully appreciated as the same becomes better understod from the following detailed description when considered in connected with the accompanying drawings in which like reference characters designate like or corresponding parts throughout the several views and wherein.

DETAILED DESCRIPTION OF THE PREFERRED EMBODIMENTS

Figure 1:
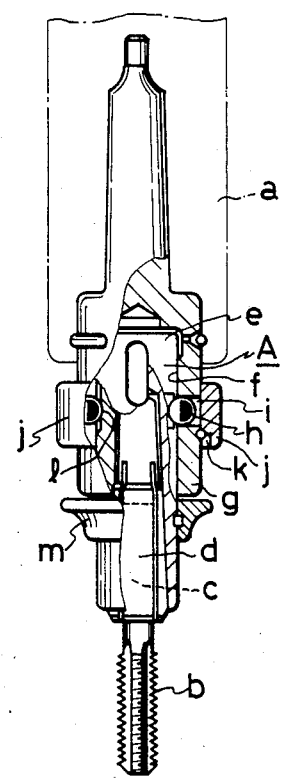
FIG. 1 is a partly sectional front elevation of the tool holder device of a conventional drilling machine.

A detailed description of the tool mounting-/demounting device for changing tools of a drilling machine according to the invention will be described with reference to FIG. 2. The main rotational shaft 4 of the drilling machine has formed at one end thereof a cylinder 3. Into an open end of cylinder 3 is inserted the shank part 2 of the tool holder 1. The tool holder is rotatably driven by the cylinder via key 1' fixed to tool holder shank 2 and inserted in key way 4'. A ring body is fixed to the cylinder 3 and has attached thereto at least one pair of tongue pieces 7 which can be opened to the radial outward direction. The tongue pieces 7 are separated from the ring body 5 by a pair of cut grooves 6 on circumferentially opposite sides of each of the tongue pieces. At the free ends of the tongue pieces 7, hook parts 9 are formed which engage with a ring groove 8 on the shank part 2 of the said tool holder 1.

A fixed cylindrical body 11 is spaced from the ring body 5 by the gap n and is fixed to the ring body 5 via a wall 10 at the end of the body 11. A collar body 16 includes a double cylindrical body 15 which consist of inner wall 12 which can be extended and contracted telescopically within the cylindrical body 11, an outer wall 13 which can slide along the outer circumference 11' of the fixed cylindrical body 11 and a radially extending bottom 14 which connects the inner wall 12 and outer wall 13. A coil spring 17 is expandingly installed between the end wall 10 and the bottom 14, and steps 18 form a stopper for the double cylindrical body 15 and are formed in the back side of the hook 9 of each of the tongues 7. Numeral 19 refers to a gripping collar fixed to the tool holder 1, and numeral 20 refers to a screw fixing the ring body 5 to the cylinder 3.

When using this embodiment for demounting a tool holder 1 mounted on the main rotational shaft 4, the main rotational shaft 4 is first stopped, the gripping collar 19 is gripped by a hand and the double cylindrical body 15 of the collar body 16 is gripped by the other hand and is lifted upwards. Then the tongue pieces 7 resiliently open outwardly and their engagement with the ring groove 8 is released, allowing the tool holder 1 to be freely removed from the cylinder 3.

For mounting the tool holder 1 to the main rotating shaft 4, the double cylindrical body 15 of the collar body 16 is first lifted against the coil spring 17 by one hand and the shank 2 is inserted into the cylinder 3 by the gripping collar 19 being grasped with the other hand. By releasing the grasp of the double cylindrical body 15 when the ring groove 8 of the shank 2 of the tool holder 1 reaches the position of the hooks 9, the double cylindrical body 15 descends due to the spring force of the coil spring 17. This causes the inner wall 12 of the double cylindrical body 15 to contract the tongue pieces 7, making the hooks 9 engage the ring groove 8. The double cylindrical body 15 stops its descent when it reaches the stopper steps 18 on the back slides of hooks and at the same time the hooks 9 are locked so that they can not move out of the ring groove 8.

Figure 4:
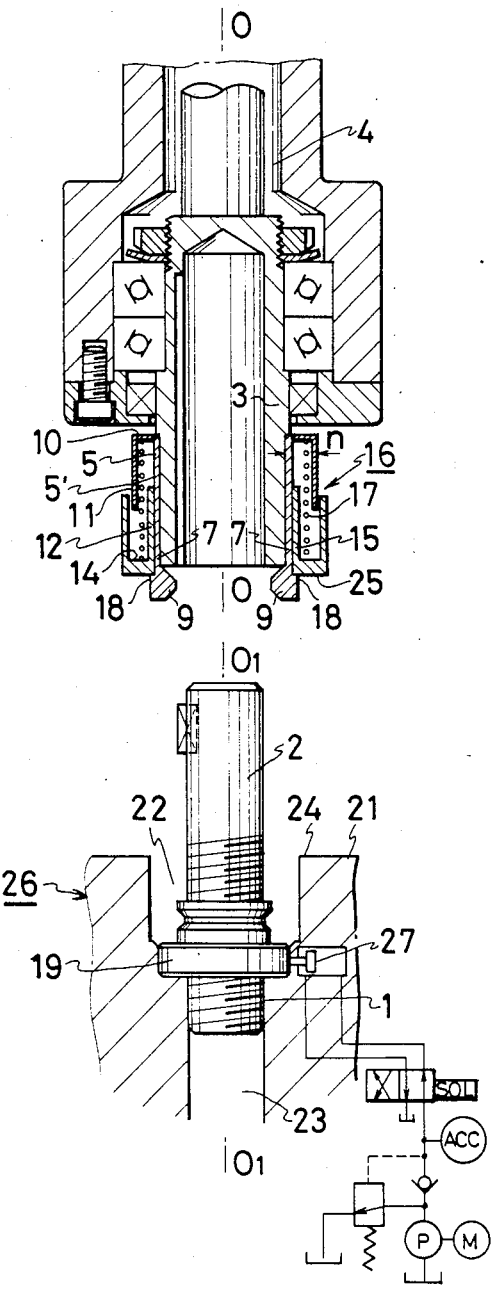
FIG. 4 is a longitudinal elevation indicating the relation between the structure of FIG. 2 and the exchange tool holder accommodation stand of the invention.

The tool mounting and demounting device for the drilling machine is, according to the invention, associated with a feature which permits one to change tools more simply and automatically by the provision of an exchange tool holder accommodation stand 26, which will be explained in detail in accordance with FIG. 4. An exchange tool holder accommodation stand 26 having a recess 22 into which the collar 19 of the tool holder 1 and the tongues 7 of the ring body 5 can be inserted is formed in the upper surface of the stand. A hole 23 is formed in the center of the recess to accommodate a rotary tool part, and the edge 24 of the recess 22 is positioned and shaped for engagement with th bottom 14 of the double cylindrical body 15. The axis $o_1$–$o_1$ of hole 23 coincides with the vertical axis o—o of the main rotational shaft 4 of the tool mounting-/demounting device for changing tools of a drilling machine, with the stand 26 positioned below the main shaft 4. A remotely controllable oil-hydraulic drive piston 27 in the stand 26 can be extended to fix the tool holder in the hole 23. Incidentally, the remotely controllable fixing device 27 is not necessarily hydraulic.

Figure 5:
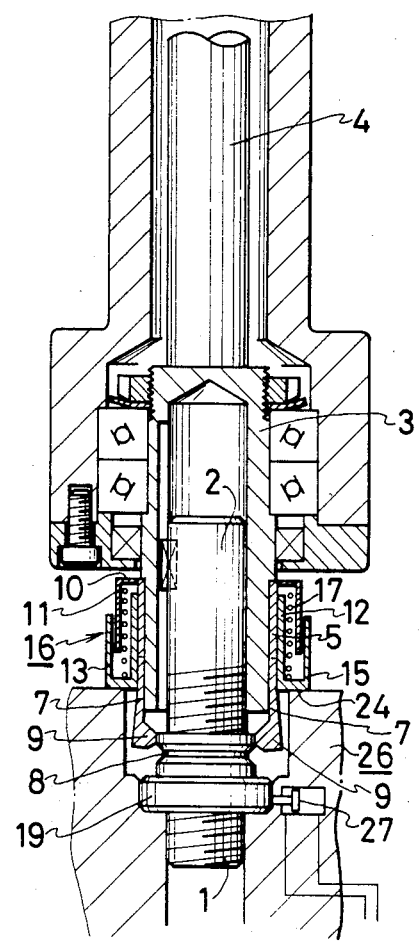
FIG. 5 is a longitudinal elevation showing the device in operation.

When engaging a tool holder 1 has a necessary tool, as the main rotating shaft 4 decends on the center line $o_1$–$o_1$ of the hole 23, the double cylindrical body 15 rises and compresses the coil spring 17 when the double cylindrical body 15 of the collar body 16 engages the edge 24 of the tool holder accommodation stand 26, as shown in FIG. 5. This opens the pair of tongues outwardly due to their resilience, and upon a further descent of the main rotational shaft 4, the pair of hooks 9 will override the edge of the ring groove 8 of the shaft part and lightly engage the ring groove 8.

Figure 2:
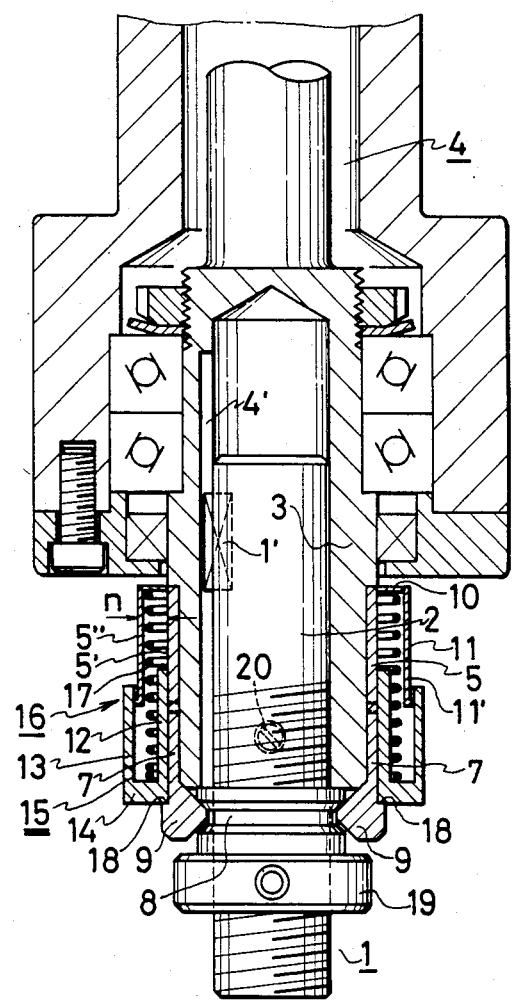
FIG. 2 is a longitudinal elevation of an embodiment of the tool mounting/demounting device for changing tools of a drilling machine according to the invention.
Figure 3:
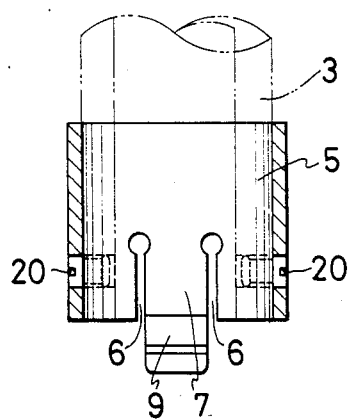
FIG. 3 is a longitudinal elevation of the ring body of FIG. 2.

When the main rotational shaft 4 is raised from its position of FIG. 5, the double cylindrical body 15 is forced down by the spring force of the coil spring 17 and moves to the position as shown in the FIG. 2 to secure the tool holder 1 with hooks 9 and complete the automatic mounting.

To return and retain the tool holder 1 in the hole 23 of the tool holder accommodation stand 26, piston 27 is forced out by remote control operation when the main rotating shaft 4 has descended along the center line $o_1$–$o_1$ of the hole 23, and the tool of the tool holder 1 is accommodated in the hole 23. As a result, a part of the tool holder 1, e.g. the gripping collar 19, is pressed by the piston 27. The hooks 9 are lightly engaged in the ring groove 8 at this time (the tongues 7 are opened outwards), so that the hooks 9 are released easily from the ring groove 8 when the main rotating shaft is subsequently raised. Only the tool holder 1 is then left in the hole 23.

Because the invention has the structure and functions described above, it allows not only easy replacement of a rotary tool (with the tool holder) on the main rotating shaft of a drilling machine by manual operation, but also offers an inexpensive device which allows automatic replacement of a rotary tool (with the tool holder) with only an up and down motion of the rotary shaft by reason of the provision of a pair of tongues 7, each having hook 9 as the picking up device of rotating tool holder at the shaft end of the main rotating shaft 4, and by the provision of an exchange tool holder accommodation stand 26 having a part engaging the double cylinder part 15 of the collar body which cooperates with the tongues 7.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A tool mounting and demounting assembly for a drilling machine, said assembly comprising:
   a drill shaft rotatable about, and movable along, a first axis;
   a tool holder having a longitudinal second axis;
   cylinder support means fixed to to one end of said drill shaft and having a bore and means for non-rotatably supporting said tool holder in said bore with said second axis aligned with said first axis;
   means for releasably securing said tool holder in said cylindrical support means, said releasably securing means comprising means forming a groove on said tool holder, said groove extending transverse to said second axis, and at least one tongue having one end fixed to said cylindrical support means and a second end forming a hook movable in a radial direction to a first position, said hook being inserted in said groove when said hook is in said first position and when said tool holder is fully inserted in said bore;
   means for stationarily supporting said tool holder with said second axis aligned with said first axis, said stationarily supporting means comprising a support body having a surface transverse to said first axis, a hole in said support body, said hole having a third axis coaxial with said first axis, and means in said hole for supporting said tool holder with said first, second and third axes in alignment;
   means for releasasbly locking said tool holder in said means for stationarily supporting said tool holder, comprising a piston in said support body movable into locking engagement with a collar of said tool holder; and
   means for releasing said means for releasably securing said tool holder in said cylinderical support means in response to movement of said drill shaft along said first axis to a position wherein a tool holder supported by said means for stationarily supporting said tool holder is at least partially inserted in said bore of said cylindrical support means, wherein said releasing means comprises a collar slidably mounted on said cylindrical support means, said collar including an inner wall slidable along said at least one tongue for pressing said hook into said first position, and a bottom; means for biasing said collar for movement in a direction from said one end of said at least one tongue toward said hook; and stop means on said at least one tongue adjacent said hook, said stop means being positoned such that said collar presses said hook into said first positoin when said collar is stopped by said stop means, and such that said collar bottom engages said transverse surface of said support body of said means for stationarily supporting said tool holder when said tool holder is at least partially inserted in said cylindrical support means bore, whereby further movement of said drill shaft toward said means for stationarily supporting said tool holder causes said collar to be lifted from said stop means to release said hook from said first position.

2. The assembly of claim 1 wherein said means for biasing comprises a spring.

* * * * *